(12) United States Patent
Lewis et al.

(10) Patent No.: US 7,014,879 B1
(45) Date of Patent: Mar. 21, 2006

(54) QUICK COOK DEHYDRATED VEGETABLES

(75) Inventors: Victor Marcus Lewis, Rushcutters Bay (AU); David Adrian Lewis, Rushcutters Bay (AU); Deborah Ann Lewis, Rushcutters Bay (AU)

(73) Assignee: Byron Australia Pty Ltd., Rushcutters Bay (AU)

( * ) Notice: Subject to any disclaimer, the term of this patent is extended or adjusted under 35 U.S.C. 154(b) by 0 days.

(21) Appl. No.: 09/744,123

(22) PCT Filed: Jul. 15, 1999

(86) PCT No.: PCT/AU99/00573

§ 371 (c)(1),
(2), (4) Date: Mar. 15, 2001

(87) PCT Pub. No.: WO00/04786

PCT Pub. Date: Feb. 3, 2000

(30) Foreign Application Priority Data

Jul. 20, 1998 (AU) ................................ PP4753

(51) Int. Cl.
 *A23L 1/025* (2006.01)
 *A23L 1/03* (2006.01)
 *A23L 1/2212* (2006.01)

(52) U.S. Cl. ............... 426/640; 426/465; 426/520; 426/615

(58) Field of Classification Search ........... 426/443, 426/640, 615, 520, 465, 639
See application file for complete search history.

(56) References Cited

U.S. PATENT DOCUMENTS

| | | | | |
|---|---|---|---|---|
| 2,509,719 | A * | 5/1950 | Birdseye | 426/640 |
| 3,038,813 | A | 6/1962 | Cording et al. | |
| 3,385,715 | A | 5/1968 | Ishler et al. | |
| 3,408,209 | A | 10/1968 | Eskew et al. | |
| 3,806,610 | A | 4/1974 | Rahman et al. | |
| 3,950,560 | A | 4/1976 | Rahman et al. | |
| 4,447,460 | A * | 5/1984 | Lewis et al. | 426/541 |
| 4,735,816 | A * | 4/1988 | Sterner et al. | 426/457 |
| 5,723,167 | A * | 3/1998 | Lewis et al. | 426/640 |

FOREIGN PATENT DOCUMENTS

| | | |
|---|---|---|
| AU | B-58903/80 | 1/1981 |
| AU | B 42800/89 | 4/1990 |
| AU | B- 41680/96 | 7/1996 |
| EP | 481923 | 6/1991 |
| GB | 576895 | 4/1946 |

OTHER PUBLICATIONS

Food Technology, vol. 11 No. 6, pp 302-306 (1957). See Col. 1.

* cited by examiner

*Primary Examiner*—Helen Pratt
(74) *Attorney, Agent, or Firm*—Scully, Scott, Murphy & Presser, P.C.

(57) ABSTRACT

Quick-cooked dehydrated vegetables having a moisture content of about 12% or less which have been compressed, but maintain a substantially intact cellular structure, and which on being placed in water at a temperature of 90° C. to 100° C. are capable of rehydration substantially to their original fresh dimensions, and are of edible tenderness and texture instantly or within five minutes, are described. Also described are processes for the production of a dehydrated, rapidly rehydrating vegetable product by compression of a partially dehydrated vegetable product.

8 Claims, No Drawings

QUICK COOK DEHYDRATED VEGETABLES

FIELD OF THE INVENTION

This invention relates to quick cooking vegetables, more particularly quick cooking dehydrated vegetables.

BACKGROUND OF THE INVENTION

Dehydrated vegetables are important items of commerce. They are processed fresh vegetables in shelf-stable form and are used extensively in the food industry, particularly to provide colour, flavour and nutritional benefits to a wide variety of dry packaged foods.

In the packaged food industry they are especially important in cup soups, cup noodles and in packaged rice and pasta dishes. These are convenience products and quick cook times are regarded as important. In many products the cooking directions call for the addition of boiling water only, without further cooking. The use of vegetables in these products may require the use of expensive freeze-dried vegetables, or else very small dehydrated vegetable pieces. As the hot product may take about two to three minutes to cool sufficiently to be comfortable to consume, it is desirable that the vegetables be sufficiently rehydrated within this time. Conventional dehydrated vegetables, even small pieces, are usually still hard and gritty after three minutes due to incomplete rehydration. Freeze-dried vegetables are expensive and often still spongy in texture after two to three minutes. For products cooked in the microwave or on stove top, a desirable cook time is as short as possible, preferably below five minutes. It is therefore highly desirable to have an economical dehydrated vegetable component that rehydrates quickly enough to be pleasant to consume after boiling water is added and allowed to stand for two to three minutes, and rehydrates back to a natural tasting piece of vegetable.

Alternate quick-cooking dehydrated vegetables such as solute added products (U.S. Pat. No. 4,683,141) or puffed vegetables (U.S. Pat. No. 3,038,813) have been described, but neither appear to give products sufficiently quick-cooking for many convenience packaged foods.

The term "vegetable" as used in this application refers to fresh or frozen fleshy vegetables such as carrots, peas, peppers, tomatoes, sweet corn and such, but does not refer to dry products of vegetable origin such as wheat, corn, dry legumes and such, and dried fruits such as apple.

U.S. Pat. No. 3,408,209 describes subjecting explosion puffed vegetables as described in U.S. Pat. No. 3,038,813 and compressing them for the purpose of reducing their bulk for packaging purposes. There is no claim that this process reduces cooking time.

There is a need for a dehydrated vegetable product with a cook time of from instant to about five minutes, which is not gritty, has a pleasant texture and mouth feel, and is inexpensive to prepare. It is to be understood that cook time refers to the time at which the vegetable piece is substantially rehydrated to its size prior to dehydration and is free from hard or gritty centres.

The result may be achieved by mechanically compressing partially dehydrated vegetable pieces, as by passing between the rolls of a roller mill or by other means, to an extent whereby the pieces are noticeably flattened, but not to such an extent that the texture of the rehydrated product is unacceptably altered from that of a rehydrated vegetable piece which had not been compressed. The vegetable is then further dried to a moisture content of about 5% or lower, or in the case of intermediate moisture products, to a higher level. Surprisingly, the compressed vegetable pieces, when rehydrated, return to much the same size and shape as the original pieces prior to initial dehydration but in a significantly shorter time than untreated dehydrated vegetables.

SUMMARY OF THE INVENTION

In one aspect, this invention provides a dehydrated vegetable product which comprises a vegetable piece having a moisture content of about 12% or less which has been compressed preferably in one dimension but still has a substantially intact cellular structure, and which on being placed in water at a temperature of 90° C. to 100° C. is capable of rehydration substantially to its original fresh dimension and is of edible tenderness and texture instantly or within five minutes.

In another aspect, this invention provides a dehydrated vegetable product prepared by partially dehydrating vegetable pieces to a moisture content from about 8% to about 30%, compressing the vegetable pieces, and thereafter further dehydrating the vegetable pieces to a moisture content of about 12% or lower.

In a further aspect, the invention provides a process for the preparation of a dehydrated, rapidly rehydrating, vegetable product by compression of a partially dehydrated vegetable product.

DETAILED DESCRIPTION OF THE INVENTION

This invention is concerned with quick-cooked dehydrated vegetables and in accordance with one aspect of the invention a dehydrated vegetable product which comprises a vegetable piece having a moisture content of about 12% or less which has been compressed but still has a substantially intact cellular structure, and which on being placed in water at a temperature of 90° C. to 100° C. is capable of rehydration substantially to its original fresh dimension and is of edible tenderness and texture instantly or within five minutes.

In accordance with a further aspect of this invention there is provided a dehydrated vegetable product prepared by partially dehydrating vegetable pieces to a moisture content from about 8% to about 30%, compressing the vegetable pieces, and thereafter further dehydrating the vegetable pieces to a moisture content of about 12% or lower.

The term "vegetable" as mentioned above refers to fleshy vegetables, such as carrots, peas, peppers, tomatoes, sweet corn, onion, squash, chillies, zucchini, mushroom, cabbage, celery, green beans, beetroot, pumpkin, and the like, and including frozen fresh vegetables, but excluding dried products of vegetable origin such as wheat, corn, dry legumes and such, and dried fruits such as apples, apricots and grapes. A "vegetable piece" may comprise a small vegetable in its totality, such as a pea, small tomato, sweet-corn kernels, mushroom and the like. The term "vegetable piece" also includes a vegetable which has been cut to a size suitable for use in the food industry, for example pieces of 10×4×4 mm.

In one embodiment, the vegetables may be washed, cut to an appropriate size as needed, optionally blanched and placed in a dehydrator, for example as used to produce dehydrated vegetables. Dehydration may be in hot air, or other forms of dehydration such as vacuum drying may be used. The cut may be dice, slices or julienne style strips. It is preferred that the least (or shortest) dimension should not be more than about 5 mm.

Vegetable pieces are partially dehydrated to a moisture content of about 8% to about 30%, preferably from about 8% to about 20%, more preferably about 8% to about 15%. At these moisture contents, the vegetable pieces, particularly when warm, are reasonably plastic. They are then compressed, preferably by passing through a roller mill similar to that used for flaking grains, or by other means known in the art such as hydraulically between flat plates. The rolls of a mill may be set at a gap between about 0.2 mm to 2.5 mm. The roll gap will depend on the dimensions of the partially dehydrated piece. If the moisture content of the piece is too high, for example greater than 30%, the vegetable may squash on to the rolls of the mill. If it is too dry, for example less than about 8%, it may shatter. The extent or fineness to which the vegetable is rolled will largely determine the cook time of the finished product. If the piece is rolled too finely, the cook time will be almost instant, but the texture may be mushy. The gap between the rolls will be determined by:

(i) thickness of the semi-dehydrated vegetable piece;
(ii) the type of vegetable and the variety;
(iii) the desired cook time;
(iv) the desired texture of the rehydrated product.

Vegetable pieces are compressed, preferably in one dimension, the compression maintaining substantially intact cellular structure such that on rehydration, for example in water of 90° C. to 100° C., it is capable of rehydration substantially to its original fresh (that is non-dehydrated) dimensions over a period of up to five minutes.

Intact cellular structure may be determined in a conventional manner, such as by microscopy of a section.

Dried vegetables which have added solutes can also be prepared in this way, for example, vegetables may contain added solutes in an amount from 0.3% to 10% w/w. The introduction of sugars and salts is described, for example, in Australian Patent No. 532414 or by other methods. Solutes which may be used include salts such as sodium chloride, sodium lactate, and sodium citrate, potassium lactate, or sugars (for example glucose, sucrose, fructose) and others known in the art such as sorbitol. The addition of solutes to the vegetables further accelerates the absorption of water, shortens the cooking time, and may improve the plasticity of the pieces during compression.

After compression, the vegetable pieces will have been flattened to a degree depending on the reduction of cook time required. The vegetable pieces may then be further dehydrated to produce a shelf-stable product. Further dehydration results in the rapid loss of moisture since the compressed product gives up its moisture very rapidly as compared to a piece which has not been compressed. The final moisture content should preferably be of about 12% or lower, such as from about 2% to about 10%, for example, more preferably 4% to 6%.

The compression of the vegetables results in greatly decreased rehydration time of the vegetable piece. Table 1 presents the effect of compression on rehydration time of compressed dehydrated vegetables with and without the addition of solutes, in this case of sodium chloride.

Table 2 shows the effect of the degree of compression during rolling on the cook time and texture of dehydrated onion.

TABLE 1

Time required for dehydrated vegetables to stand in water at 90° to 100° C. to be sufficiently rehydrated and tender to be very acceptable for eating. All vegetables compressed through 0.5 mm roll gap except peas which were rolled through a 1.5 mm gap.

| Vegetable Dimensions are before dehydration | Control Not Rolled | Rolled | 5% Solute Added Rolled |
|---|---|---|---|
| Tomato 10 mm peeled dice | 8 mins | 4 mins | 2 mins |
| Onion 10 mm dice | 10 mins | 3 mins | 1½ mins |
| Red Bell Peppers 8 × 8 mm dice | 6 mins | 1½ mins | 1 min |
| Sweet Corn whole kernels | 10 mins | 4 mins | 3 mins |
| Green Peas | 8 mins | 4 mins | 3 mins |
| Carrot 10 × 4 × 4 mm dice | 6 mins | 3 mins | 2 mins |

TABLE 2

Effect of degree of compression on rehydration time of 10 × 10 mm dehydrated onion dice containing 5% salt on standing in water at 90° to 100° C.

| Gap Between Rolls | Rehydration Time | Comments |
|---|---|---|
| 0.3 mm | below 1 mm | Rehydrated pieces mushy, did not re-hydrate to original fresh dimensions |
| 0.5 mm | 1 mm | Slightly mushy. Some loss of texture |
| 0.8 mm | 2½ mins | Crisp but well rehydrated |
| Unrolled control | 10 mins | Well rehydrated |

By use of compression as described, varying cook times can be selected for vegetable pieces of almost instant, upwards. The cook time can be varied for each vegetable by adjusting:

1. The initial size of the vegetable piece.
2. The degree of compression.
3. The addition of solutes.
4. The nature of the solutes added.

A further advantage of the compressed vegetables is that they have a greater tendency to float on the surface than traditional dehydrated vegetables. This is probably due to their lower bulk density.

Surprisingly unless compressed to an excessive degree the compressed vegetables exhibit surprisingly a marked ability to rehydrate to the initial shape of the fresh vegetable piece.

EXAMPLE 1

Onions with a solids content of 14% were peeled and diced, 10×10 mm pieces were dehydrated in a hot air dryer at 70° C. to a moisture content of 15%. The partially dried pieces were compressed by passing through a roller mill with a gap of 0.5 mm. The semi-dried onions passed readily through the mill without sticking or shattering. They were then further dried at 60° C. to a moisture content of 5%. When placed in a cup with boiling water poured over them, the pieces were sufficiently rehydrated to consume after one and a half minutes.

EXAMPLE 2

Peeled carrots with a total solids content of 12% were diced into pieces 10×4×4 mm. The pieces were steam blanched for one minute, then coated with sufficient salt solution to give a salt content in the final product of 5% w/w. The carrot was dehydrated at 70° C. in a hot air dryer to a moisture content of 20%. The pieces were compressed by passing through a roller mill with the gap set at 0.4 mm, and then dried further at 70° C. to 5% moisture.

When placed in a cup of boiling water and allowed to stand, the carrot pieces were quite tender and sufficiently rehydrated to eat after two minutes.

Dehydrated vegetables with rapid rehydration times can thus be produced by compressing partially dehydrated vegetables for example by passing through the gap of a rollermill prior to final dehydration. The increased speed of rehydration can be further increased by the compression of vegetables to which solutes have been added.

Throughout this specification and the claims which follow, unless the context requires otherwise, the word "comprise", or variations such as "comprises" or "comprising", will be understood to imply the inclusion of a stated integer or step or group of integers or steps but not the exclusion of any other integer or step or group of integers or steps.

What is claimed is:

1. A process for the preparation of a dehydrated, rapidly rehydrating, vegetable product which comprises:
    a) partially dehydrating vegetable pieces to a moisture content from about 8% to about 30%,
    b) prior to compressing the vegetable piece in one dimension one or more solutes are added to the piece,
    c) compressing the vegetable piece in one dimension to about 0.2 to 2.5 mm, and
    d) thereafter further dehydrating the compressed vegetable piece to a moisture content of about 12% or lower,
   wherein the vegetable piece when placed in water at a temperature of 90° C. to 100° C. without further application of heat is capable of rehydration substantially to its original fresh dimension and is of edible tenderness and texture instantly or within five minutes.

2. A process according to claim 1 wherein the vegetable is selected from the group consisting of carrots, peas, peppers, tomatoes, sweet corn, onion, squash, chillies, zucchini, mushroom, cabbage, celery, green beans, beetroot and pumpkin.

3. A process according to claim 1 wherein said solutes are selected from the group consisting of sodium chloride, potassium chloride, sodium lactate, potassium lactate, sodium citrate, glucose, sucrose, fructose and sorbitol.

4. A process according to claim 1 wherein the compressed vegetable piece in step d) is dehydrated to a moisture content from about 2% to about 12%.

5. A process according to claim 4 wherein the vegetable piece is dehydrated to a moisture content from 4% to 6%.

6. A process according to claim 1 wherein said vegetable piece is compressed in a roller mill.

7. A process according to claim 1 wherein said added solutes are present in an amount from 0.3% to 10% w/w.

8. A process according to claim 1 wherein the vegetable piece is dehydrated in step a) to a moisture content which is from about 8% to about 20%.

* * * * *